United States Patent [19]

McGregor et al.

[11] Patent Number: 5,689,364
[45] Date of Patent: Nov. 18, 1997

[54] LIGHT REFLECTANT SURFACE FOR PHOTOINDUCTION CHAMBERS

[75] Inventors: Gordon L. McGregor, Landenberg, Pa.; Raymond B. Minor, Elkton, Md.; Gregory E. Hannon, Newark; Robert Lyon Henn, Wilmington, both of Del.

[73] Assignee: W.L. Gore & Associates, Inc., Newark, Del.

[21] Appl. No.: 569,411

[22] Filed: Dec. 6, 1995

Related U.S. Application Data

[63] Continuation-in-part of Ser. No. 369,850, Jan. 6, 1995, Pat. No. 5,596,450.

[51] Int. Cl.$^6$ ............................ G02B 5/08; G02B 5/02
[52] U.S. Cl. .................... 359/350; 359/361; 359/599; 315/39; 315/248
[58] Field of Search .................... 359/350, 361, 359/599; 315/39, 248, 344

[56] References Cited

U.S. PATENT DOCUMENTS

| | | | |
|---|---|---|---|
| 3,953,566 | 4/1976 | Gore | 264/288 |
| 3,962,453 | 6/1976 | Gore | 260/2.5 R |
| 4,035,085 | 7/1977 | Seiner | 356/179 |
| 4,096,227 | 6/1978 | Gore | 264/210 R |
| 4,152,618 | 5/1979 | Abe et al. | 313/116 |
| 4,187,390 | 2/1980 | Gore | 174/102 R |
| 4,507,697 | 3/1985 | Wood et al. | 315/39 |
| 4,523,319 | 6/1985 | Pflost | 372/94 |
| 4,571,448 | 2/1986 | Barnett | 136/259 |
| 4,718,974 | 1/1988 | Minaee | 156/643.1 |
| 4,764,932 | 8/1988 | Peterson et al. | 372/35 |
| 4,805,181 | 2/1989 | Gibson et al. | 372/72 |
| 4,902,423 | 2/1990 | Bacino | 210/500.36 |
| 4,912,720 | 3/1990 | Springsteen | 372/72 |
| 4,994,673 | 2/1991 | Perna et al. | 250/483.1 |
| 5,037,618 | 8/1991 | Hager | 422/186.03 |
| 5,039,918 | 8/1991 | Oktake et al. | 315/918 |
| 5,116,115 | 5/1992 | Lange et al. | 351/212 |
| 5,263,042 | 11/1993 | Kojima et al. | 372/72 |
| 5,537,203 | 7/1996 | Carr | 356/236 |

FOREIGN PATENT DOCUMENTS

| | | |
|---|---|---|
| 0372224 A2 | 6/1990 | European Pat. Off. . |
| 7 235714 | 9/1995 | Japan . |
| 96/21168 | 7/1996 | WIPO . |

OTHER PUBLICATIONS

Robert D. Saunders and Henry J. Kostkowski, "Roughened Quartz Surfaces and Teflon as Small Angle Diffusers and Depolarizers between 200 and 400 nm," Applied Optics, vol. 28, No. 15, Aug. 1, 1989, pp. 3242–3245.

Victor R. Weidner and Jack J. Hsia, "Reflection Properties of Pressed Polytetrafluoroethylene Powder," J. Opt. Soc. Am./ vol. 71 No. 7 Jul. 1981, pp. 856–861.

International Search Report for PCT/US96/15111.

Literature: Carol J. Bruegge, Albert E. Stiegman, Daniel R. Coulter, Robert R. Hale, David J. Diner, Arthur W. Springsteen, "Reflectance Stability of Spectralon Diffuse Calibration Panels," SPIE vol. 1493, (1991) pp. 132–142.

Literature: TK Lewellen, RS Miyaoka, SG Kohlmyer, "Improving the Performance of the SP-3000 PET Detector Modules," Nov. 1991, pp. 1604–1608.

(List continued on next page.)

Primary Examiner—Jon W. Henry
Attorney, Agent, or Firm—David J. Johns

[57] ABSTRACT

Improved material and method for reflecting light in a photoinduction chamber is provided. The material comprises one or more layers of expanded polytetrafluoroethylene (ePTFE) membrane. Employing an ePTFE membrane as a reflective surfaces is demonstrated as providing excellent diffuse reflective properties, especially in the ultraviolet and visible ranges of light. Additionally, the material of the present invention has many other properties that make it particularly desirable for use in various photoinduction chamber applications, including inertness, flexibility, ease in shaping and installation, etc.

10 Claims, 10 Drawing Sheets

OTHER PUBLICATIONS

Literature: K. Wisshak, F. Kappeler and H. Muller, "Prototype Crystals For the Karlsruhe 4 Barium Fluoride Detector," NIMPR A251 (1986) 101–107.

Literature: A.W. Springsteen, "A Novel Class of Lambertian Reflectance Materials For Remote Sensing Application," SPIE vol. 1109 Optical Radiation Measurements II (1989), 133–141.

Technical Information: Arthur W. Springsteen, "Properties of Spectralon Reflectance Material," (date unknown).

General Information: "Diffuse Reflectance Materials and Coatings," (author and date unknown).

Brochure: Solid Sample Measurements UV–VIS–NIR, Varian VA, pp. 1,5 (date and author unknown).

Brochure: "Labsphere," Dr. A. Springsteen (date unkown).

Brochure: "Labsphere Corporate Profile", Dr. A. Springsteen (date unkown).

S. Nutter, C.R. Bower, M.W. Gebbard, R.M. Heinz and G. Spiczak, "Sintered Halon as a diffuse Reflecting Liner for Light Integration Boxes," Nuclear Instruments & Methods in Physics Research, Section A., vol. A310, No. 3, Dec. 15, 1991, pp. 665–670.

5,689,364

LIGHT REFLECTANT SURFACE FOR PHOTOINDUCTION CHAMBERS

RELATED APPLICATIONS

The present application is a continuation-in-part of U.S. patent application Ser. No. 08/369,850 filed Jan. 6, 1995 now U.S. Pat. No. 5,596,450.

BACKGROUND OF THE INVENTION

1. Field of the Invention

The present invention relates to surfaces used to reflect light, and particularly to highly light reflectant surfaces for the purpose of enhancing the efficiency of chambers using visible and/or ultraviolet light to impart changes to materials or bodies placed in them.

2. Description of Related Art

Light energy from the ultraviolet (UV) and visible wavelengths of the electromagnetic spectrum can cause both favorable and undesirable changes in a wide variety of materials. These light induced changes, hereby referred to as "photoinduction," can include: chemical change (actinic), such as in UV curing of polyurethanes; structure and color change, such as in the degradation of polymers; and biological change, such as in UV induced water sterilization equipment, germicidal lamps and suntanning booths.

All of the above mentioned photoinduced material changes can be created and controlled through various types of specialized optical equipment. This equipment, although it differs from application to application, shares some common components such as: a light source, typically a UV lamp; a reflector to direct and maximize light radiation onto the sample material; and a chamber in which to partially or completely house or contain the photoinduction process. In some cases the reflector is incorporated into the walls of the chamber.

The nature of the reflectant material may be critical to maximize the efficiency of the system. The higher the reflectance of the reflectant material, the more light energy is available to be redirected towards the sample material, where photoinduction is desired to take place.

One such photoinduction application is the curing of polymeric resins through the exposure of ultraviolet and/or visible light. A UV curable resin system achieves the transition from liquid to solid by many means such as chain addition polymerization or an epoxy reaction, triggered by a photochemical interaction. Many systems, have a photoinitiator, which is the active component of the material formulation. It is the energy absorber which starts the reaction when exposed to ultraviolet light. Typical applications which utilize these types of UV curable systems can include, but are not limited to, UV curable inks; protective coatings for wood, paper, plastics, and metal; electronic applications, such as solder masks and photoresist; and a wide range of UV curable adhesives. The advantages that a UV curable system typically offers over existing methods are numerous. Typically these systems are solvent free, which eliminates health, safety, and hazardous waste concerns. These systems also require less energy to cure, require less space for curing equipment, and can cure rapidly, thereby increasing production line speeds. Furthermore, UV curing can also offer enhanced mechanical properties to the substrate not found with existing systems.

UV curing equipment utilizes various methods for producing high intensity ultraviolet light. The three usual means of generating UV energy are mercury arc lamps, pulsed lamps (e.g., xenon flash), and electrodeless lamps. In each case, ultraviolet light is emitted from a rare gas, metal vapor, or metal halide plasma contained in a sealed quartz tube. In virtually all cases, such as is described in U.S. Pat. No. 3,983,039, a reflector is used to redirect the majority of the light from the source to the substrate to be cured.

Typically, UV lamp reflectors are available in two shapes: elliptical and parabolic. Elliptical reflectors are used to achieve basic requirements for curing in "UV-Vis" (i.e., ultraviolet and/or visible light) electromagnetic spectrum, which gives the highest intensity and most efficient cure. Parabolic reflectors will yield dispersed radiation or broad beam light useful in large area curing. Aluminum is used most frequently since it is thought to be the most efficient reflector material, having a reflectivity of about 86% to 90% in the UV wavelengths.

Another significant application which utilizes a photoinduction technique is the process of sterilization and/or disinfection of fluids, such as water or other process fluids, by the use of germicidal lamps. These lamps emit light at about 254 nanometers, which is highly efficient in the destruction of microorganisms. Ultraviolet irradiation is rapidly becoming the method of choice for disinfection/sterilization without the use of chemicals such as chlorine. The major advantage of UV being that nothing is introduced to the fluid stream that may have to be removed later. Additionally, UV does not affect the physical or chemical properties of water, therefore, no change occurs in pH, color, odor, temperature, or taste. Application of ultraviolet purification systems include, but are not limited to, purification of water for food and beverage use, fermentation products, cosmetics, pharmaceuticals, ultra-pure electronics, etc. Processing fluids requiring purification can include photographic processing chemicals, ion exchange resin beds, etc.

Another sterilization application is described in U.S. Pat. No. 5,433,920 where a process for sterilizing the interior of food cartons is described for aseptic packaging. The medium pressure mercury vapor lamp in this application generates UV light in the wavelengths of 240 to 370 nanometers. An aluminum reflector is utilized for directing light into the cartons.

Another photoinduction application, referred to in U.S. Pat. No. 5,037,618, utilizes intense ultraviolet radiation in the presence of an oxidant such as hydrogen peroxide for the purpose of breaking down hazardous molecules into simpler and safer compounds. This oxidation chamber utilizes a UV reflective surface on the walls parallel to the lamps. The composition of these panels or coatings is selected for several properties, which include UV reflectivity, corrosion resistance, abrasion resistance, and ease of application and installation. It has been recognized that conventional polytetrafluoroethylene (PTFE) has many of the above desirable properties; however, to date its reflectance performance is relatively poor except in the 250-350 nanometer regions using relatively thick cross sections.

There are many other types of photoinduction chambers which utilize reflectors other than those mentioned above. One example is what is commonly known as a "suntanning booth," which directs UV light towards a user's skin to cause pigmentation (color change) of the skin. Another example is an indoor actinic test chamber for the accelerated testing of UV stability of polymers such as the color stability of plastics.

As should be appreciated, there are many applications which utilize a reflector for redirecting UV and or visible light within a photoinduction chamber. However, it is believed that most reflectant materials used in these applications are deficient in one or more respects.

The predominant reflecting material used in most of the above applications is polished aluminum. It is believed that aluminum is the material of choice because of its durability, low cost, and relatively high reflectivity compared to other known alternatives. Conventional PTFE (e.g., TEFLON® brand PTFE available from E. I. dupont de Nemours & Company, Wilmington, Del.) is occasionally used in corrosive applications. Unfortunately, conventional PTFE suffers from relatively low reflectance at thinner material cross sections.

Another form of PTFE is sold under the trademark SPECTRALON by Labsphere, Inc., North Sutton, N.H. As described in U.S. Pat. No. 4,912,720, this material comprises lightly packed granules of polytetrafluoroethylene that has a void volume of about 30 to 50% and is sintered into a relatively hard cohesive block so as to maintain such void volume. This material exhibits a relatively high level of visible reflectance, but limited level of UV reflectance. It is not known to be used in any of the above applications. Some objections to using this material may be its lack of durability, flexibility, and cleanability. Furthermore, this material is reported to be relatively expensive and therefore not cost effective.

Accordingly, it is a primary purpose of the present invention to provide an improved material for use in effectively reflecting UV and visible light in a chamber. This and other purposes of the present invention should become evident from review of the following specification.

SUMMARY OF THE INVENTION

The present invention is an improved material and method for providing improved reflectivity of UV-Vis light in a photoinduction chamber which incorporates a UV and/or visible lamp. The invention employs a reflectant material comprising an expanded polytetrafluoroethylene (PTFE) having polymeric nodes interconnected by fibrils defining microporous voids therein. The reflectant material is mounted within the chamber such that light from the lamp strikes and reflects from the reflectant material to provide efficient and effective use of the light within the chamber. It has been determined that this expanded PTFE structure of the reflectant material used in the present invention provides extremely high reflectivity, with significantly better than 95% reflectance of light provided even at relatively thin material cross sections. In fact, the material of the present invention has demonstrated higher diffuse reflectivity than the best diffuse reflective materials presently employed.

Equally important, the material employed in the present invention demonstrates many other properties that make it particularly desirable for use as a reflectant material in photoinduction chambers. First, the material is highly flexible, allowing a multiple sided cavity or parabolic shaped reflectors to be readily formed from a single piece. By reducing the seams which are inherent in a multiple piece product, total reflectance can be further enhanced. Second, the material is easily die-cut, allowing each piece to be sized to the appropriate dimensions using clean and efficient methods. Third, the material used in the present invention demonstrates excellent reflectant properties even at relatively thin (e.g., <1 mm) thicknesses, making the material lighter, reducing material volume, and being less expensive to employ than presently available materials. Moreover, the material of the present invention lends itself to use in many applications not previously available. The material of the present invention is very stable over time with respect to a wide range of environmental conditions, making it ideally suitable for applications requiring long life stability in harsh environmental conditions. Furthermore, the material of the present invention has extremely low UV-visible light absorption which enables the material to remain virtually unaffected when exposed to these often harmful wavelengths.

DESCRIPTION OF THE DRAWINGS

The operation of the present invention should become apparent from the following description when considered in conjunction with the accompanying drawings, in which.

DETAILED DESCRIPTION OF THE INVENTION

The present invention relates to surfaces used to reflect light, and particularly to highly light reflectant surfaces in the ultraviolet and visible wavelengths for photoinduction chambers. "Photoinduction chamber" is meant to describe any volume of space where light energy is reflected in a controlled manner in order to effectuate a physical, chemical, or biological change due to light energy impinging upon some surface. A photoinduction chamber would typically include one or more UV and/or visible light sources and a reflector for redirecting light towards a subject material. The chamber can either be partially or totally enclosed to contain or direct the light energy. Typically batch type processes employ a totally enclosed chamber whereas continuous processes would normally utilize a partially enclosed chamber.

As the term "light" is used herein, it is intended to include any form of electromagnetic radiation, but especially that in the spectrum of UV-visible light (250 to 750 nm wavelength) and through infrared (IR) light radiation (750 to greater than 2500 nm wavelength). For the present invention involving photoinduction chambers, UV and the visible wavelengths are considered of the primary importance. It should be appreciated that the material of the present invention may be tailored to modify reflectance in particular bands of light energy through the use of coatings, fillers, or similar materials or modification of ePTFE structure.

Figure 1:
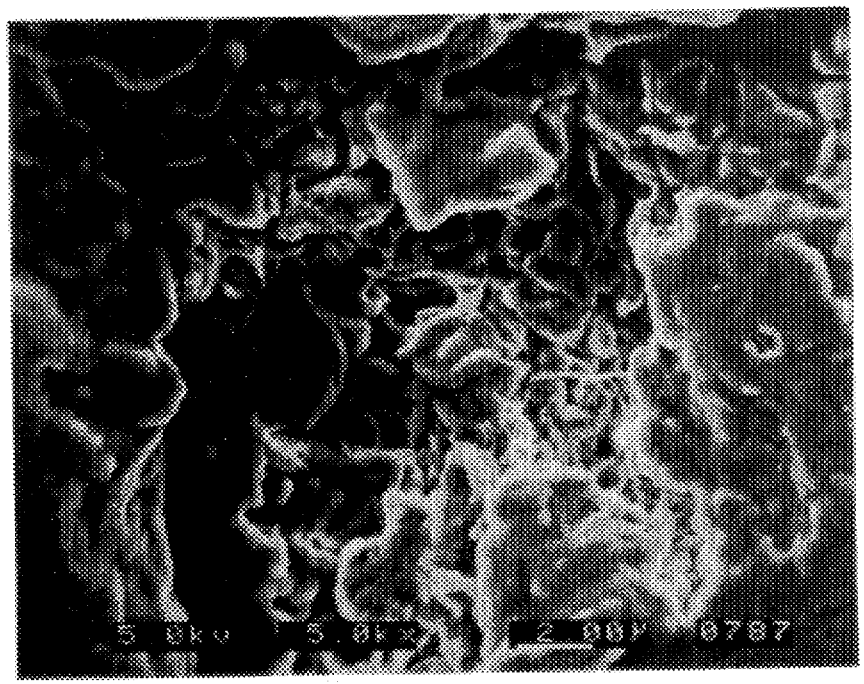
FIG. 1 is a scanning electron micrograph (SEM), enlarged 5000 times, showing the surface of a light reflectant material of a commercially available reflective material.

As has been explained, one type of PTFE reflectant material commercially available today is that sold under the trademark SPECTRALON by Labsphere, Inc., of North Sutton, N.H. This material comprises a granular polytetrafluoroethylene material that is lightly packed and then molded into a rigid block. FIG. 1 is a scanning electron micrograph (SEM) of a surface of a ½ inch thick reflectant sheet of SPECTRALON material. While this material provides good reflectivity of visible and near IR light, its reflectance diminishes in the UV wavelengths below 325 nanometers and it has a number of drawbacks that constrain its use. Among the perceived problems with this material are: difficulty in processing due to its rigidity, especially where non-planar reflectant surfaces are required; limited range of effective light reflectance across UV-visible and IR light spectrum; relatively thick minimum thicknesses (i.e., its effective reflectance diminishes at thicknesses of less than about 4 mm); and less than optimum reflectivity.

Figure 2:
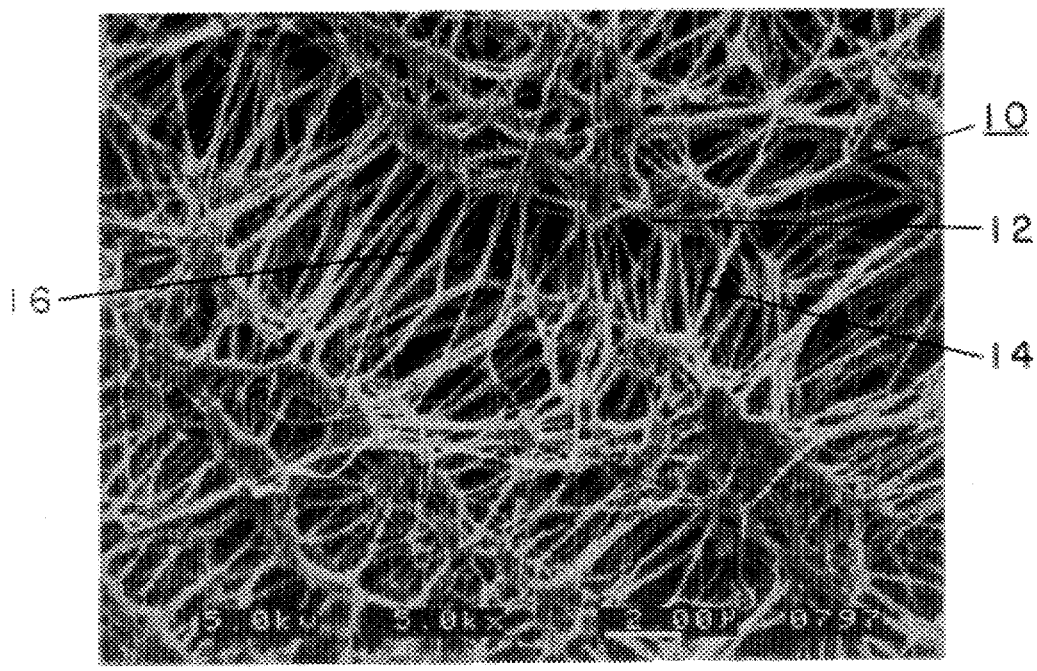
FIG. 2 is an SEM, enlarged 5000 times, showing the surface of one embodiment of a light reflectant material of the present invention.

The present invention employs a distinctly different material comprising an expanded polytetrafluoroethylene (PTFE), such as that made in accordance with U.S. Pat. Nos. 3,953,566, 3,962,153, 4,096,227, 4,187,390, and 4,902,423, all incorporated by reference. This expanded PTFE material comprises a microporous structure of microscopic polymeric fibrils (i.e., thread-like elements) interconnecting polymeric nodes (i.e., particles from which fibrils emerge). The structure of a biaxially expanded example of this material is shown in the SEM of FIG. 2. This material 10 comprises polymeric nodes 12 and numerous fibrils 14 extending from the nodes 12. As can be seen, numerous microporous voids 16 are provided within the material 10. As the term "expanded PTFE" is used herein, it is intended to include any PTFE material having a node and fibril structure, including in the range from a slightly expanded structure having fibrils extending from relatively large nodes of polymeric or other material, to an extremely expanded structure having fibrils merely intersect with one another at nodal points.

Expanded PTFE has a number of important properties that make it particularly suitable as a reflectant surface of the present invention. First, PTFE is a highly inert material that is hydrophobic. Accordingly, the material is resistant to both water and a wide variety of other materials that could damage some other reflectant surfaces. Additionally, by expanding PTFE in the manner taught by U.S. Pat. No. 3,953,566 to form the node and fibril structure, the material undergoes a significant increase in tensile strength and becomes highly flexible. Moreover, while packed granular based PTFE material provides good reflectant properties, it has been discovered that the node and fibril structure of expanded PTFE provides a much higher reflectance property.

A preferred reflectant material of the present invention is made in the following manner. A fine powder PTFE resin is blended with a lubricant, such as odorless mineral spirits, until a compound is formed. The volume of lubricant used should be sufficient to lubricate primary particles of the PTFE resin so as to minimize the potential of the shearing of the particles prior to extruding.

The compound is then compressed into a billet and extruded, such as through a ram type extruder, to form a coherent sheet of extrudate. A reduction ratio of about 30:1 to 300:1 may be used (i.e., reduction ratio=cross-sectional area of extrusion cylinder divided by the cross-sectional area of the extrusion die). For most applications a reduction ratio of 75:1 to 100:1 is preferred.

The lubricant may then be removed, such as through volatilization, and the dry coherent extrudate sheet is expanded rapidly in at least one direction about 1.1 to 50 times its original length (with about 1.5 to 2.5 times being preferred). Expansion may be accomplished by passing the dry coherent extrudate over a series of rotating heated rollers or heated plates at a temperature of between about 100° and 325° C., such as through the method taught in U.S. Pat. No. 3,953,566. Alternatively, the extruded sheet may be expanded in the manner described in U.S. Pat. No. 4,902,423 to Bacino, prior to removal of the lubricant.

In either case, the material may be further expanded at a ratio of 1:1.1 to 50:1 (with 5:1 to 35:1 being preferred) to form a final microporous sheet. Preferably the sheet is biaxially or multi-axially expanded so as to increase its strength in both its longitudinal and transverse directions. Finally, the material may be subjected to an amorphous locking step by exposing it to a temperature in excess of 340° C.

The material of the present invention is preferably made in the form of sheets, which, due to their inherent flexibility, may be formed into a wide variety of other shapes as desired, such as tubes, strips, convex or concave structures, etc. Additionally, to address particular applications, the material of the present invention may likewise be extruded or otherwise formed into continuous tubes, rods (i.e., cylinders), rectangles, uneven shapes, and other structures that may be of interest.

Sheets made from the above processing steps can be produced in thicknesses ranging from, but not limited to, 0.01 mm to 12 mm or more. Sheets can be subsequently layered upon themselves and subjected to temperatures ranging from about 300° C. to 400° C. while applying sufficient pressures to bond the layers together.

Figure 3:
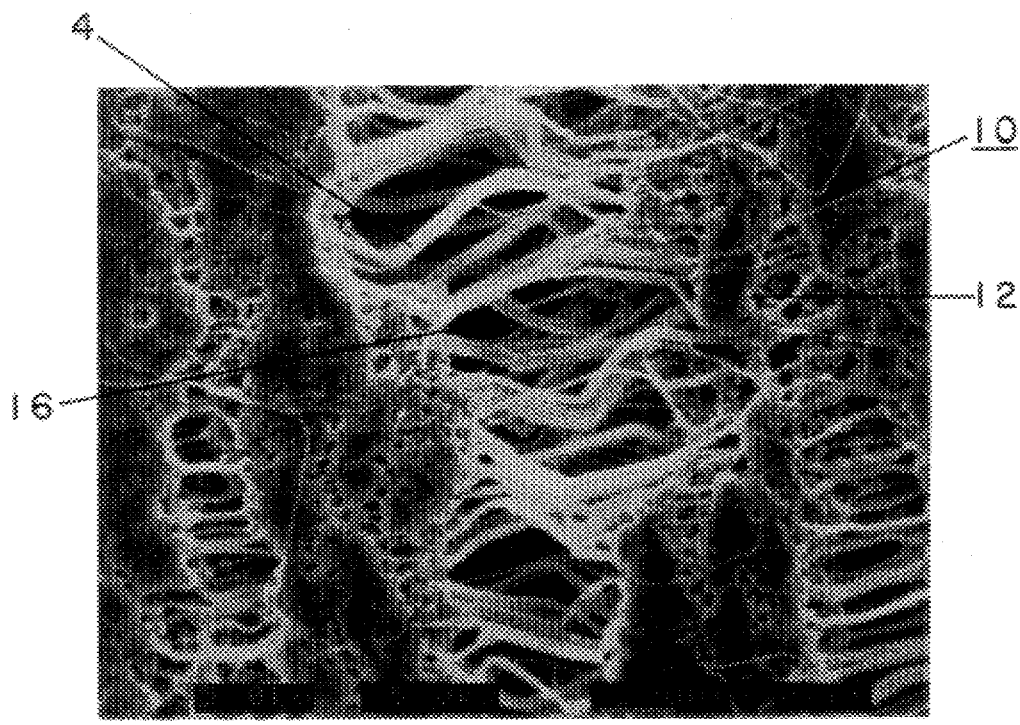
FIG. 3 is an SEM, enlarged 5000 times, showing the surface of another embodiment of a light reflectant material of the present invention.

It has been determined that by providing a microporous surface of polymeric nodes and fibrils, such as that of expanded PTFE, and particularly one that has been expanded in more than one direction, light is reflected off the node and fibril structure at a very high efficiency rate, with very even dispersion (i.e., diffusion) of the light. The SEM of FIG. 2 shows expanded PTFE material 10 that has undergone extensive expansion in two different directions. This structure exhibits a relatively "fine" structure with fibrils 14 oriented in both x and y directions, and small nodes 12 where the fibrils intersect. Still another embodiment of the present invention is shown in the SEM of FIG. 3. In this case, the expanded PTFE has been expanded in only the longitudinal direction. In this example there is a "coarser" structure characterized by larger nodes 12 and thicker fibrils 14. The fibrils 14 are oriented predominantly in a longitudinal direction.

As is explained in greater detail below, the present invention demonstrates extremely high reflectivity. When compared to aluminum, the present material of choice for photoinduction chamber reflectors, the reflectant material of the present invention exhibited substantially higher reflectivity. Furthermore, the material exhibits a very predictable, flat-line reflective response across a wide spectrum of light.

Figure 4:
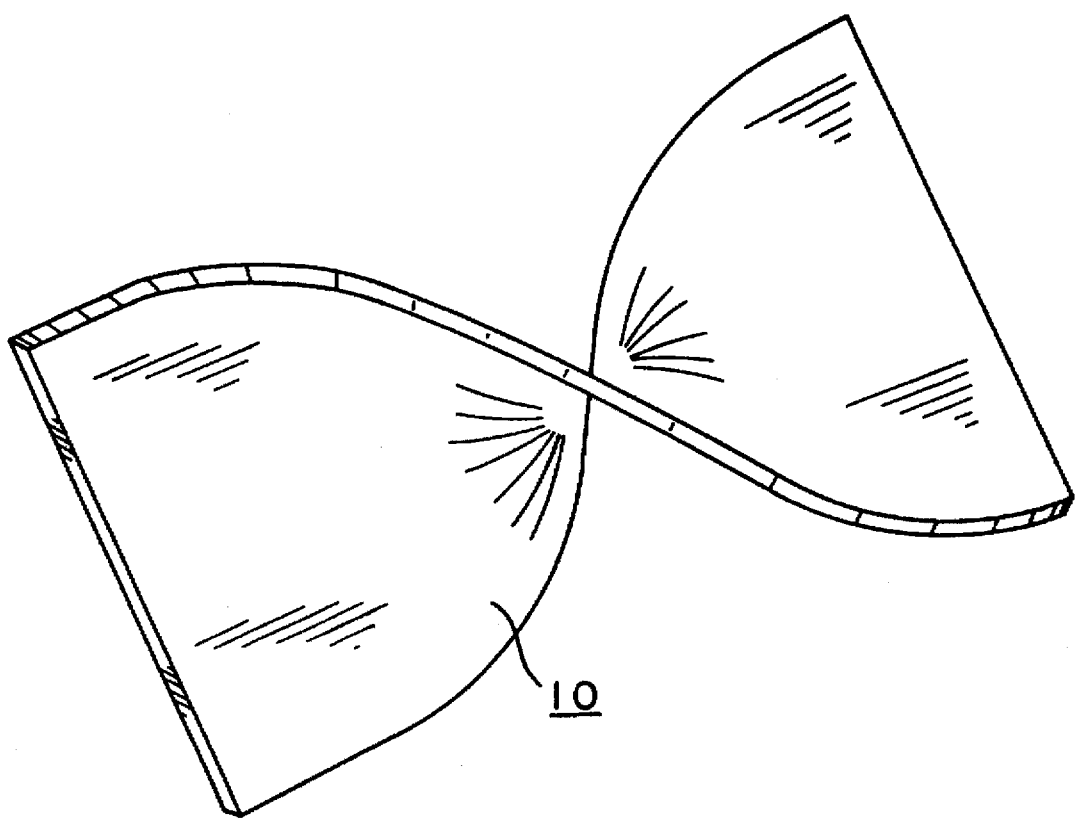
FIG. 4 is a three-quarter isometric view of a reflectant material of the present invention, wherein the flexibility of the material is demonstrated.

Another important improvement of the present invention is shown in FIG. 4. The reflectant material 10 of the present invention is highly malleable, moldable, and flexible, allowing it to be bent, twisted, curved, or otherwise formed into any suitable shape. In this respect, the reflectant material of the present invention is a dramatic improvement over previously available other reflectant materials, such as polished aluminum that must be machined into desired shapes. With the material of the present invention, a host of different non-planar shapes can be formed with minimal effort. These types of thin, flexible, formable materials having a high reflectivity (e.g., 90 to 95% to 99% or more) should have great value for a range of various photoinduction chamber applications.

Another valuable property of the inventive reflector material is that the base material of PTFE is not subject to corrosion from moisture and chemical elements. Where these environmental conditions are present it would present yet another advantage over polished aluminum.

The present invention may comprise single or multiple layers of expanded PTFE, or may comprise a laminate of one or more layers of expanded PTFE and a backing support material. Since the expanded PTFE membrane alone tends to be susceptible to stretching and distortion, for some applications it may be preferred that the membrane be mounted to a support layer, such as through lamination to a flexible woven or non-woven material, that will help maintain the shape of the image layer during use. One suitable support layer is applied by applying an adhesive material, such as moisture curable polyurethane or solvated polyurethane, to the expanded PTFE membrane and then applying the adhesive-coated expanded PTFE membrane to a flexible backing material (e.g., polyester, polypropylene, MYLAR®, KEVLAR®, nylon, etc.). The two materials can then be bonded to each other under applied pressure, such as by rolling the material between one or more pairs of nip rollers. With use of a moisture curable polyurethane adhesive to bond an expanded PTFE membrane to a woven fabric, such as nylon, the application of a pressure of about 1150 g per linear meter is sufficient to bond the materials together. The materials are then allowed to moisture cure for a period of about 48 hours before use.

In addition, to create complex shapes, an expanded PTFE sheet can be bonded to a rigid support material and then formed as a composite into shapes, such as parabolic or ellipsoidal domes. One suitable method for such forming techniques comprises using vacuum forming devices.

Without intending to limit the scope of the present invention, the following examples illustrate how the present invention may be made and used:

EXAMPLE 1

A reflectant material of the present invention was prepared in the following manner:

A fine powder PTFE resin was combined in a blender with odorless mineral spirits (ISOPAR K available from Exxon Corp.) until a compound was obtained. The volume of mineral spirits used per gram of fine powder PTFE resin was 0.275 cc/gm. The compound was compressed into a billet and extruded through a 1.14 mm gap die attached to a ram type extruder to form a coherent extrudate. A reduction ratio of 47:1 was used.

Subsequently, the odorless mineral spirit was volatilized and removed, and the dry coherent extrudate was expanded uniaxially in the longitudinal direction 4.0 times its original length by passing the dry coherent extrudate over a series of rotating heated rollers at a temperature of 300° C. The sheet was subsequently subjected to an amorphous locking step by passing the sheet over a series of rotating heated rollers at a temperature of 385° C. such that the material was in contact with the rollers for about 12 seconds.

This material formed a relatively course expanded structure such as that shown in FIG. 3.

EXAMPLE 2

Another sheet of the present invention was produced in the same manner as Example 1 except for the following differences:

The volume of mineral spirits used per gram of fine powder PTFE resin was 0.297 cc/gm. The compound was compressed into a billet and extruded through a 1.52 mm gap die attached to a ram type extruder to form a coherent extrudate. A reduction ratio of 70:1 was used.

Subsequently, the odorless mineral spirit was volatilized and removed. Three layers of the dry coherent extrudate were then stacked and expanded uniaxially in the longitudinal direction 4.6 times its original length by passing the dry coherent extrudate over a series of rotating heated rollers at a temperature of 310° C. The sheet was subsequently subjected to an amorphous locking step by passing the sheet over a series of rotating heated rollers at a temperature of 385° C. for about 40 seconds.

Again, this material formed a relatively course expanded structure such as that shown in FIG. 3.

EXAMPLE 3

A sheet of the present invention was produced in the following manner:

A fine powder PTFE resin was combined with an odorless mineral spirit. The volume of mineral spirits used per gram of fine powder PTFE resin was 0.275 cc/gm. This mixture is aged below room temperature to allow for the mineral spirits to become uniformly distributed within the PTFE fine powder resin. This mixture was compressed into a billet and extruded at approximately 8300 kPa through a 0.71 mm gap die attached to a ram type extruder to form a coherent extrudate. A reduction ratio of 75:1 was used.

The extrudate is then rolled down between two metal rolls which were heated to between 30°–40° C. The final thickness after roll down was 0.20 mm. The material was transversely expanded at a ratio of 3:1 and then the mineral spirits were removed from the extrudate by heating the mass to 240° C. (i.e., a temperature where the mineral spirits were highly volatile). The dried extrudate was transversely expanded at 150° C. at a ratio of 3.5:1. After expansion, the sheet was amorphously locked at greater than 340° C. and cooled to room temperature. This material forms a relatively fine expanded structure such as that shown in FIG. 2.

Multiple layers of this sheet material can then be stacked, placed under pressure, and exposed to a temperature of about 360° C. for about 30 minutes to bond the layers into a cohesive sheet of virtually any desired thickness.

EXAMPLE 4

Layered expanded PTFE material similar to that described in Example 3 above is commercially available from W. L. Gore & Associates, Inc., Elkton, Md., as a sheet gasket material under the trademark GORE-TEX GR® sheet gasketing. This material is available in different thicknesses (i.e., constituting different number of layers formed into cohesive sheets). In order to test the effectiveness of the material of the present invention as compared to commercially available light reflectant materials, various samples of sheet gasketing material were tested as follows:

Sample 1: A composite sheet comprising about 15 layers of expanded PTFE sheets with the following properties:
Thickness: 0.5 mm
Density: 0.60 g/cc Sample 2: A composite sheet comprising about 25 layers of expanded PTFE sheets with the following properties:
Thickness: 1.0 mm
Density: 0.57 g/cc Sample 3: A composite sheet comprising about 60 layers of expanded PTFE sheets with the following properties:
Thickness: 2.2 mm
Density: 0.61 g/cc Sample 4: A composite sheet comprising about 85 layers of expanded PTFE sheets with the following properties:
Thickness: 3.4 mm
Density: 0.59 g/cc Sample 5: A composite sheet comprising about 150 layers of expanded PTFE sheets with the following properties:
Thickness: 6.2 mm
Density: 0.51 g/cc Additionally, material similar to that described in Examples 1 and 2, above, is commercially available from W. L. Gore & Associates, Inc., as a gasket tape under the trademark GORE-TEX® gasket tape. Again, this material is available in different thicknesses. Samples of this material were tested as follows:

Sample 6: A gasket tape comprising a single layer of relatively course expanded PTFE with the following properties:
Thickness: 1.0 mm
Density: 0.50 g/cc Sample 7: A gasket tape comprising a single layer of relatively course expanded PTFE with the following properties:
Thickness: 3.3 mm
Density: 0.66 g/cc

EXAMPLE 5

Several single layers as described in Example 3 were then stacked upon itself without pressure and heat to form a composite of two, three, and four layered material. These examples are herein designated as Samples 8, 9, and 10 respectively.

Sample 8: A composite sheet comprising 2 layers of expanded PTFE sheets with the following properties:
Thickness: 0.07 mm
Density: 0.61 g/cc Sample 9: A composite sheet comprising 3 layers of expanded PTFE sheets with the following properties:
Thickness: 0.11 mm
Density: 0.61 g/cc Sample 10: A composite sheet comprising 4 layers of expanded PTFE sheets with the following properties:
Thickness: 0.15 mm
Density: 0.61 g/cc Each of Samples 1 through 10 were tested in the following manner to quantify their reflective properties:

A 2 inch by 2 inch swatch from each of Samples 1 through 7 was placed in a CARY 5E Spectrophotometer with a Labsphere integrating sphere. The spectral range measured was 175 nm to 2500 nm. Data below 250 nm was not reported due to the unreliability of the standard material below this value. All measurements were made in the double-beam mode with the same working standard in the sphere's reference reflectance port. The reflectance standard used was of SPECTRALON material, Labsphere Serial Number SRS-99-010-8111-A. Photomultiplier detection was used below 800 nm and lead sulfide detection was used above 800 nm. All measurements were normalized with respect to the baseline of the system. This data is then corrected by multiplying it by the correction factors supplied with the reflectance standard. This data was then averaged and plotted.

Figure 5:
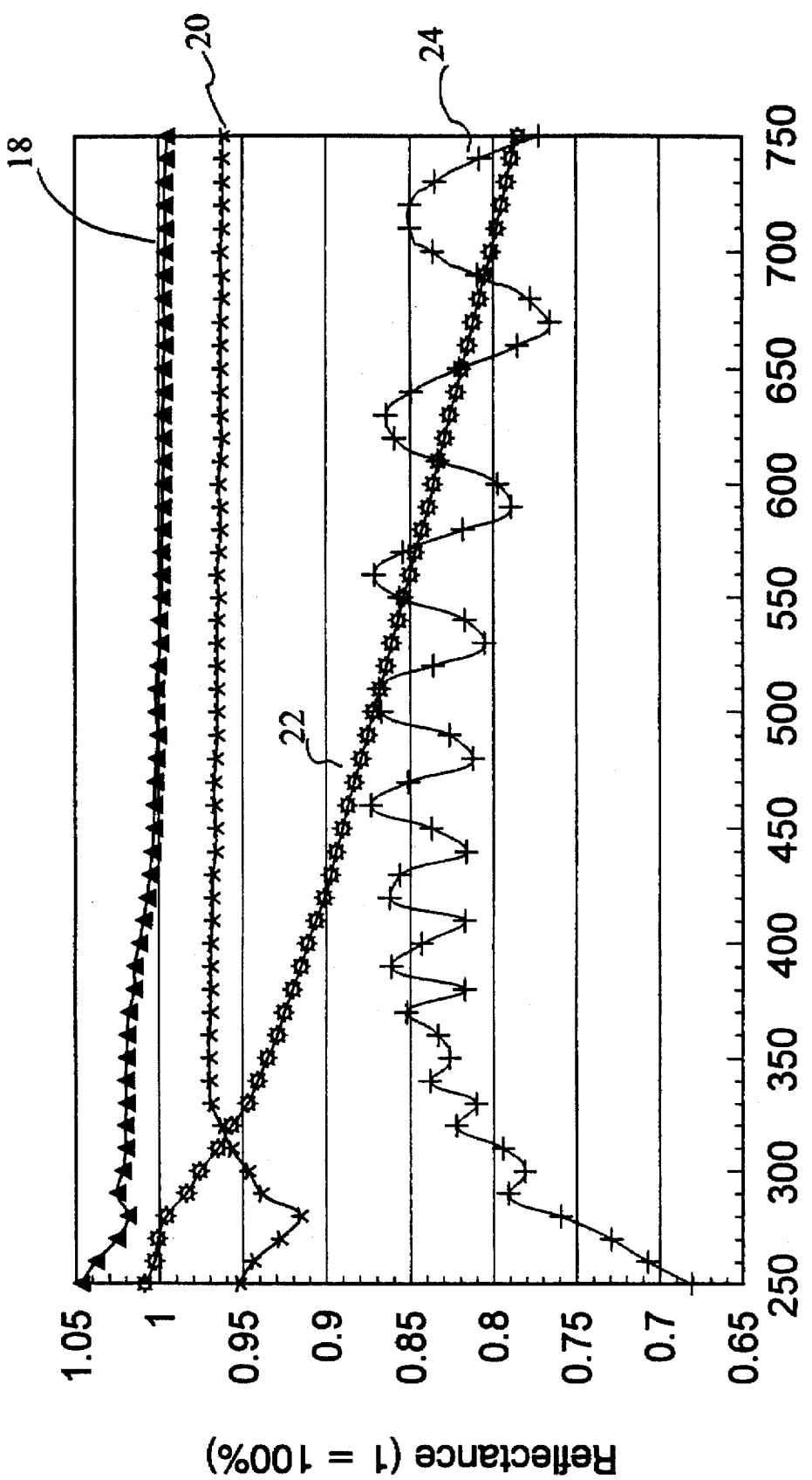
FIG. 5 is a graph plotting the reflectance verses wavelength of a reflectant material of the present invention as compared to commercially available materials.

The graph of FIG. 5 records the reflectance verses light wavelength of one sample of the present invention as compared with three commercially available reflectant materials. Line 18 is the performance of the material of Sample 4 of the present invention. Line 20 is a 3 mm thick commercially available reflectant material called SPECTRALON available from Labsphere, Inc., North Sutton, N.H. Line 22 is a 3.2 mm thick another PTFE reflectant material called FLUOROGLAS 513892 T100 125 available from Allied-Signal Inc., Hoosick Falls, N.Y. Line 24 is a reflectant material of polished aluminum called BRITELITE available from Aquarium Products, Glen Burnie, Md. As can be seen, at all wavelengths of the UV-visible light tested, the reflectant material of the present invention demonstrated markedly higher reflectivity than the commercially available reflectant materials.

It should be noted here that the reflectivity numbers reported herein are not asserted to show better than complete reflectance of light, but, rather, as demonstrating significantly better reflectance than the present state-of-the-art SPECTRALON reflectant material which was used as the calibration test standard in the spectrophotometer.

Figure 6:
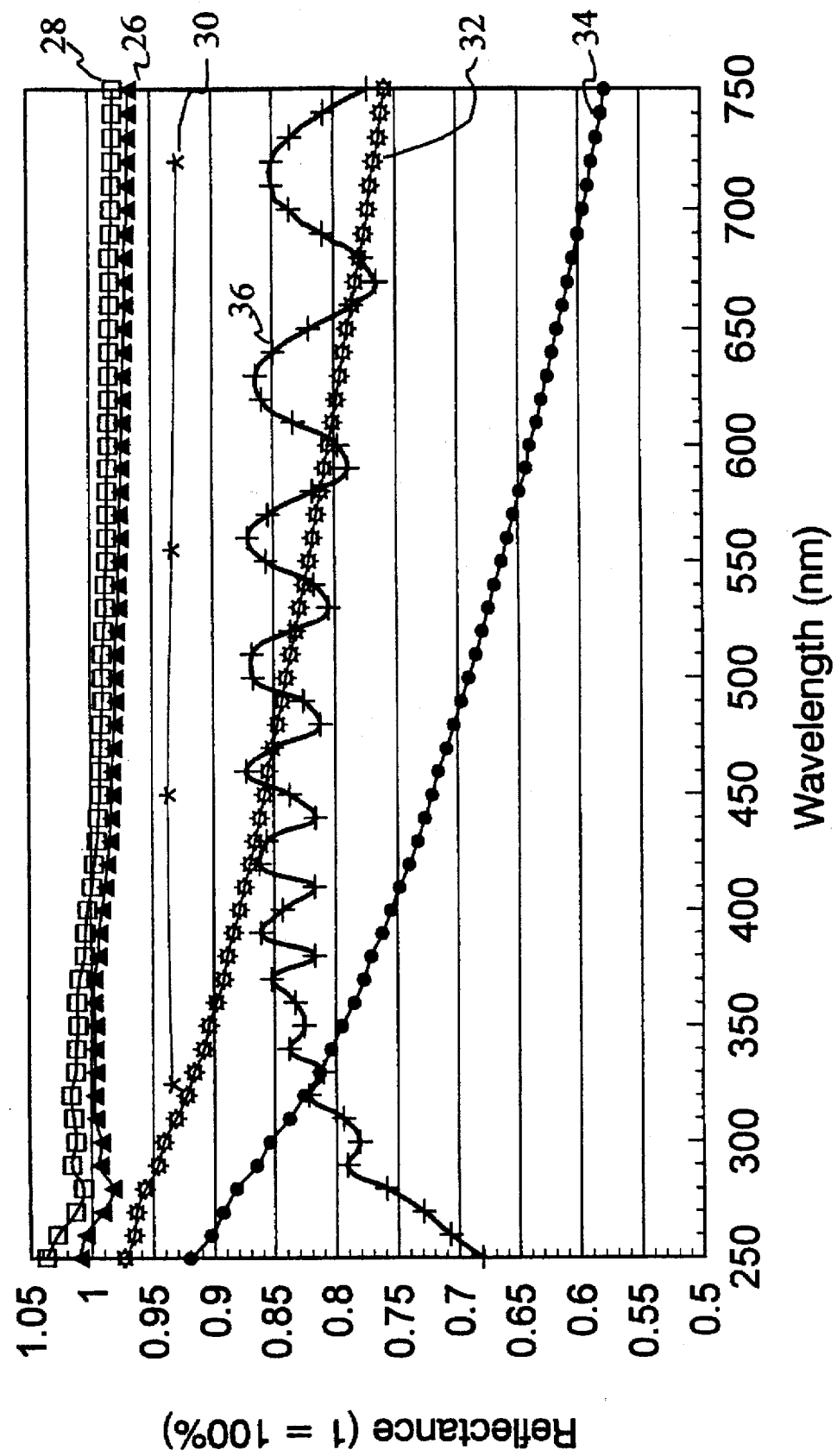
FIG. 6 is a graph plotting the reflectance verses wavelength of a reflectant material of the present invention as compared to commercially available materials.

The graph of FIG. 6 records the reflectance verses light wavelength of different thicknesses of inventive material compared to other reflective materials. Lines 26, and 28 represent the performance of inventive samples 1 and 2, respectively. Line 30 represents the reflectance performance of 1 mm thick SPECTRALON as reported in the Labsphere technical literature. Lines 32 and 34 represent the reflectance of 1.6 mm and 0.8 mm thick conventional skived PTFE available from McArnold-Desco of Wilmington, Del. Line 36 is a reflectant material of polished aluminum called BRITELITE available from Aquarium Products, Glen Burnie, Md. This graph demonstrates that even at thinner cross sections, the inventive material outperforms the reflectant aluminum and even other thicker cross section PTFE reflectant materials in all wavelengths tested in the UV-visible light spectrum.

Figure 7:
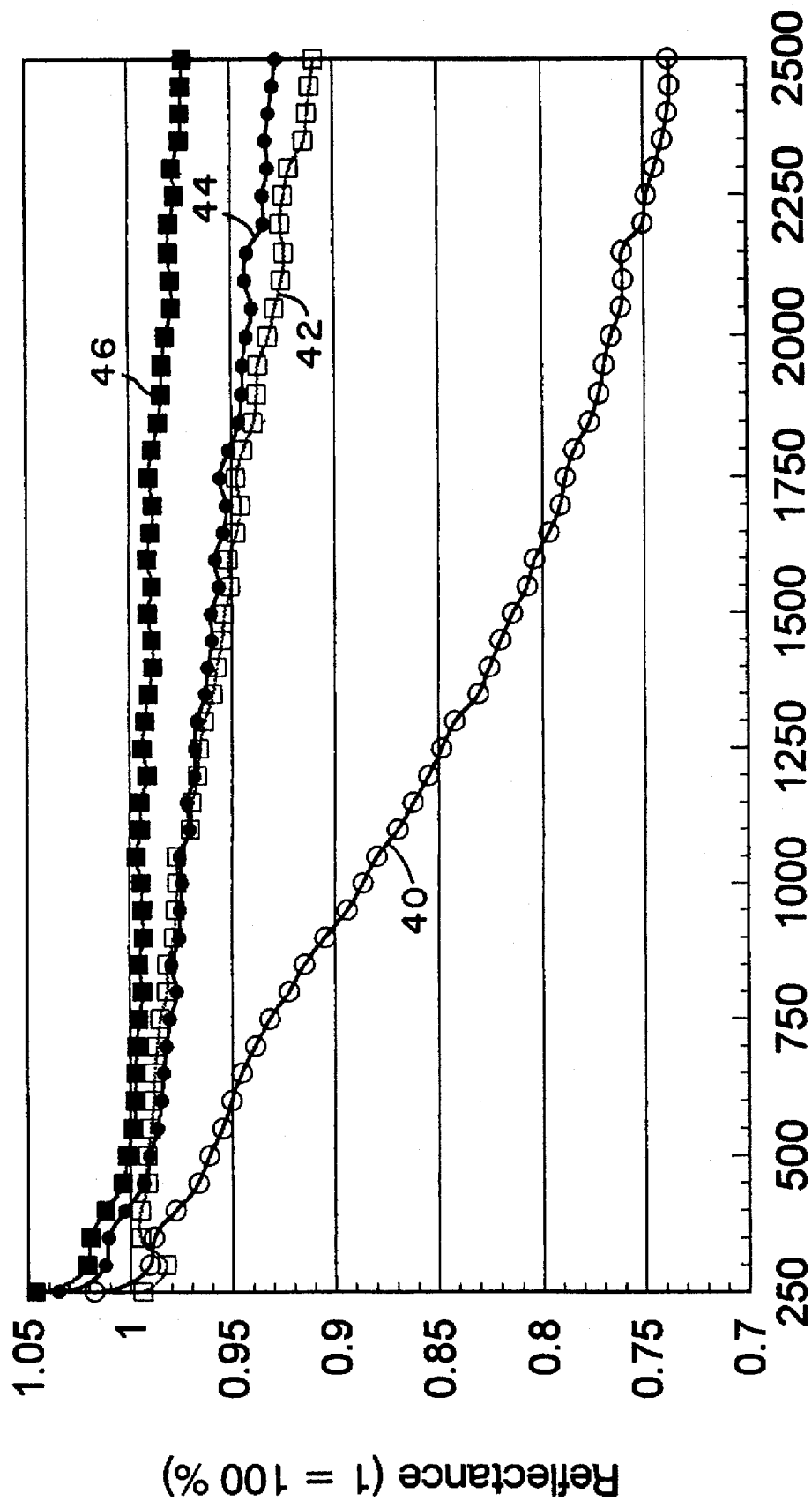
FIG. 7 is a graph plotting the reflectance verses wavelength of various structures of embodiments of the reflectant materials of the present invention.

The graph of FIG. 7 records the reflectance verses light wavelength of four samples with similar densities of expanded PTFE material of the present invention. Of the four samples, there are two different thickness levels represented, with a coarse and fine structure material at each level. Lines 40 and 42 represent Samples 6 and 7, respectively, each with a relatively coarse structure characterized by large nodes and thick fibrils. Lines 44 and 46 represent Samples 2 and 4, respectively, each having a relatively fine structure characterized by small nodes and fine fibrils.

In like thickness comparisons, the finer structure material demonstrated much higher reflectivity than the coarser structure material at all wavelengths tested. For instance, Sample 2 with a thickness of 1.0 mm was substantially more reflective than Sample 6 with the same thickness of 1.0 mm.

Figure 8:
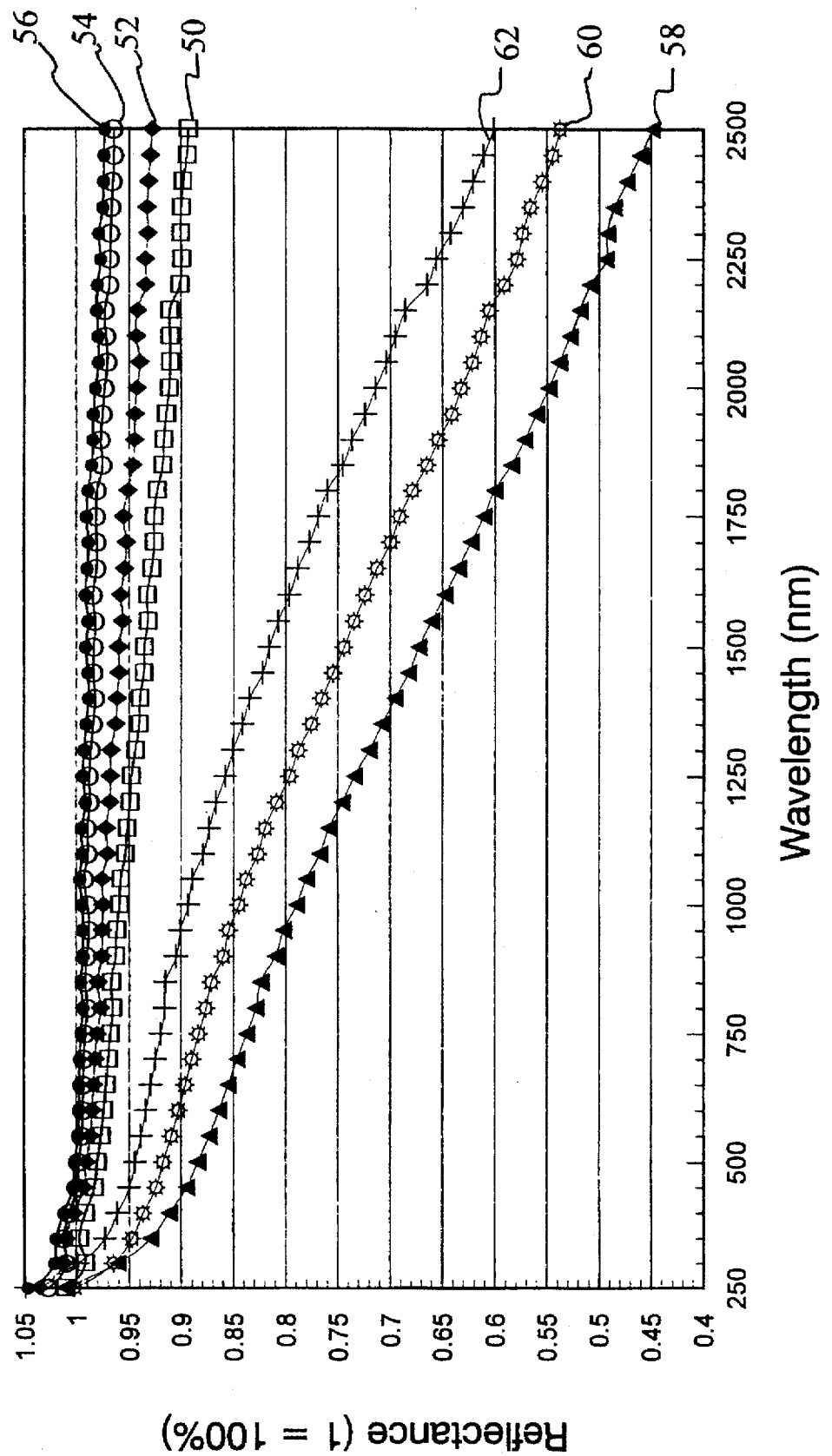
FIG. 8 is a graph plotting the reflectance verses wavelength of varying thicknesses of the reflectant material of the present invention.

The graph of FIG. 8 represents the reflectance of various thicknesses of the inventive material. Lines 50, 52, 54, and 56 represent the reflectance of samples 1, 2, 3, and 4 respectively from Example 4. Lines 58, 60, and 62 represent the reflectance of samples 8, 9, and 10 respectively from Example 5. As can be seen materials of similar structure increase in reflectance as their thickness increases. With decreasing thickness there is a greater loss of reflectance towards the higher wavelengths (in the infrared region of 750 to 2500 nanometers).

In some applications, such as UV curing, the substrate that is being cured may not be able to withstand the relatively high infrared heat that can be delivered from the UV curing lamps. In these type of applications, it may be desirable to have a reflector which is highly reflective in the UV regions but have low reflectivity in the IR regions(i.e., being absorptive and/or transmissive of IR radiation). Therefore, some of the thinner inventive materials may be suitable for these applications.

It should also be noted that the material of the present invention may be modified through processing or additional fillers and/or coatings to provide high reflectance in one range of the light spectrum and absorbence in another range of the spectrum. For some applications, it is known in the art to incorporate coatings and or absorbers in the reflector to minimize the reflected IR energy in the form of heat that radiates from the reflector towards the substrate. Some examples of suitable fillers for modifying the reflective properties of the inventive material include carbon, titanium dioxide, and a wide range of pigments.

Another method for controlling the heat dissipation of the inventive reflecting material is by the addition of fillers and or coatings that modify the thermal conductance of the material. Boron nitride is an example of one such filler which may be used to increase the thermal conductivity while having little effect on reflectance Other examples of fillers which increase the thermal conductivity include silicon oxide, alumina, zinc, graphite, zinc oxide, etc.

EXAMPLE 6

Figure 9:
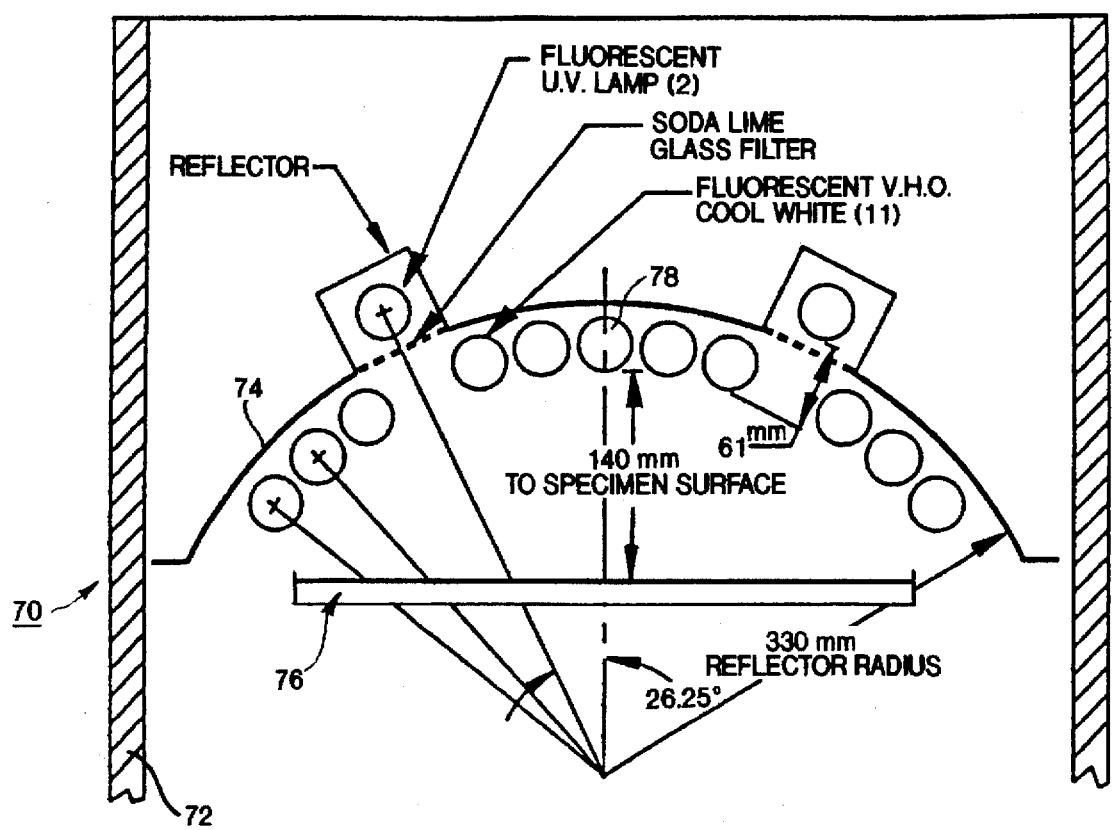
FIG. 9 is a side view drawing of an indoor actinic test chamber.
Figure 10:
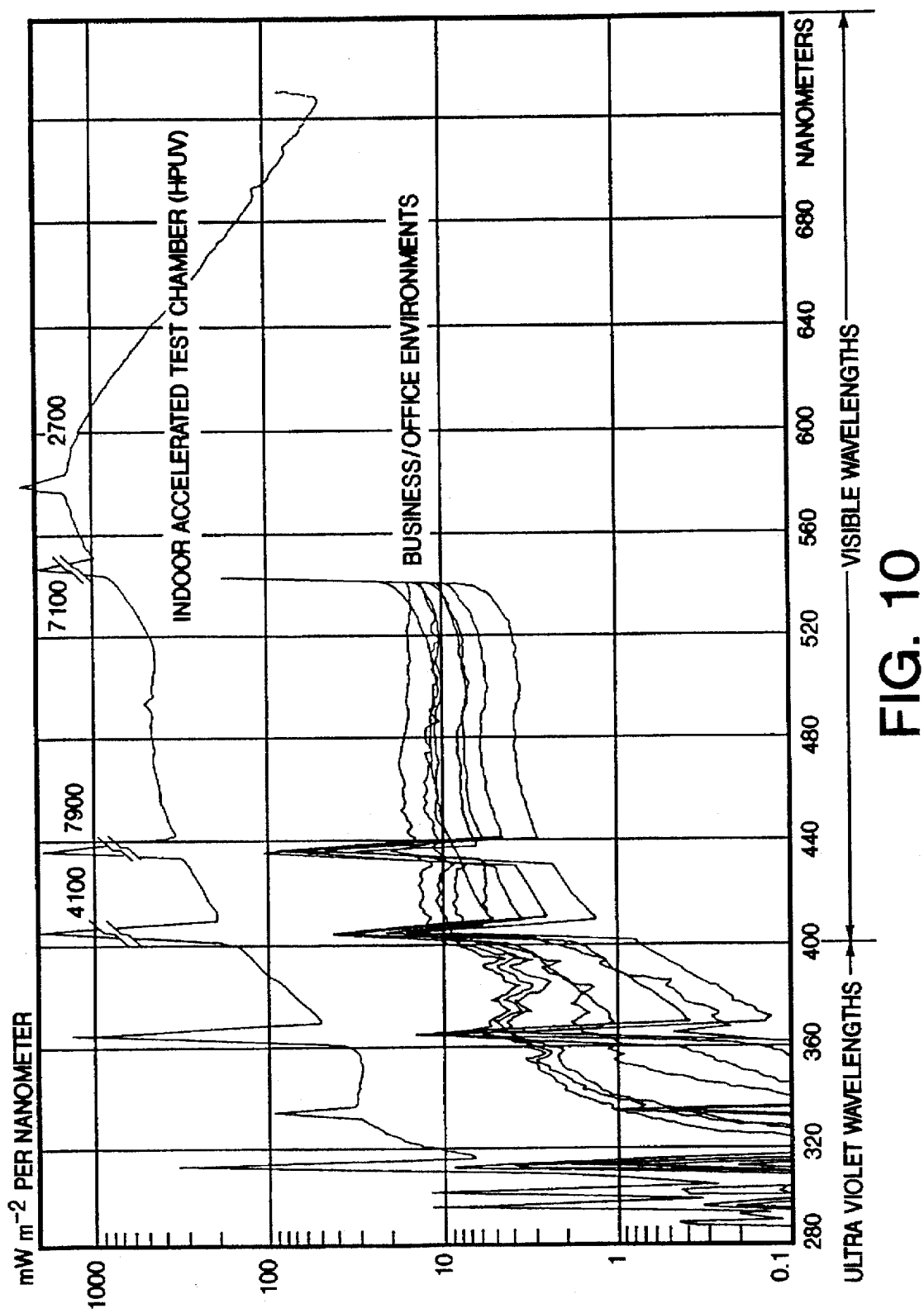
FIG. 10 is a graph plotting the spectral energy distribution of an indoor accelerated test chamber.

Another application for the inventive material is in an indoor actinic test chamber. These photoinduction chambers are utilized to conduct accelerated studies on the affect of UV light on various plastic materials. A typical chamber 70 is described in ASTM test method D4674 and is shown in FIG. 9. The test chamber 70 is generally constructed of UV reflective aluminum 72 with a clear, chromate conversion coating. An arched reflector 74 with a radius of 330 mm serves as the chamber roof. A test drawer 76 made also of reflective aluminum is place 140 mm from the lower edge of a center bulb 78. Samples for evaluation are placed on the sample drawer 76 for a specified amount of exposure time. The typical source light spectral energy distribution of the indoor accelerated test chamber is shown in FIG. 10.

Inventive material produced in the same manner as Example 3 was used to line the top of the sample drawer 76 of the chamber. This composite sheet comprising about 20 layers of expanded PTFE sheets was measured to be 0.8 mm thick with a density of about 0.6 g/cc. Measurements of ultraviolet and visible light levels were taken both before and after introducing the inventive material lining the sample tray. The ultraviolet light level increased approximately 24% over the original aluminum surface. The visible light level increase was measured to be 30%. This procedure was repeated three times. The percentage increase remained constant for all three tests.

An additional test was also conducted on the inventive material that lined the actinic chamber as described above. The material was exposed to the light energy equivalent of fifteen years in a business/office environment. The material was tested for color difference periodically throughout the duration of the test using a spectrophotometer according to ASTM D2244 test method. No significant color change was detected. Typically, most polymeric materials degrade in the UV wavelengths and therefore undergo some physical color change when exposed to this duration of light energy.

EXAMPLE 7

Figure 11:
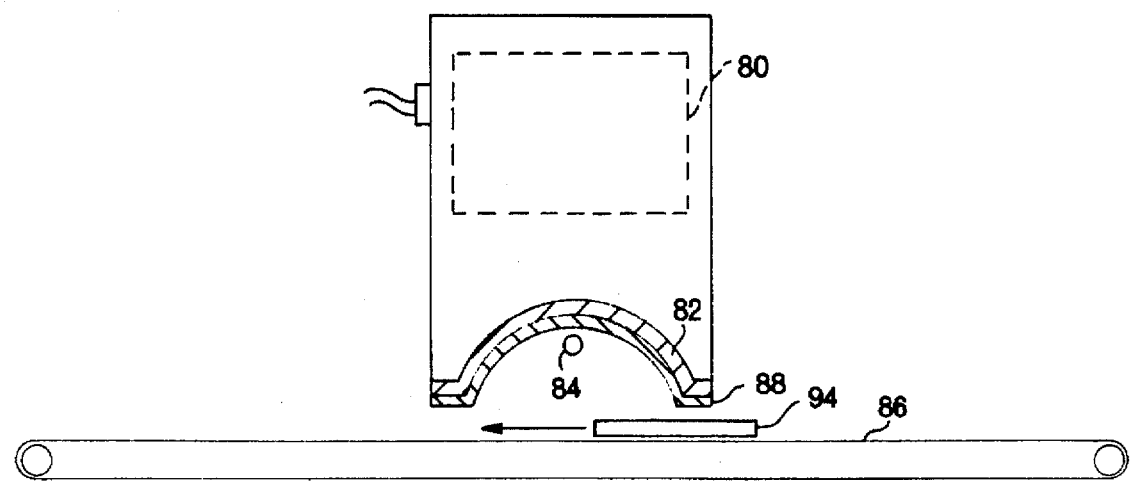
FIG. 11 side view drawing of a UV curing lamp system using the reflectance material of the present invention.

In another example the inventive material is employed in a UV curing lamp system. The system used was a model F300 Ultraviolet Lamp System supplied by Fusion Systems Corporation, Rockville, Md. The system as shown in FIG. 11 incorporates a magnetron 80, a polished aluminum waveguide and reflector 82, a electrodeless mercury vapor lamp 84, and a conveyor belt 86. The photoinduction chamber in this application can be identified as the partially enclosed area beneath the reflector and including the reflector and the portion of the conveyor belt under the reflector. The system operates as follows: The magnetron 80 is a diode vacuum tube in which the flow of electrons is controlled by an externally applied magnetic field to generate power at microwave frequencies. The microwave energy is directed towards the electrodeless mercury vapor lamp 84. The lamp is a closed quartz tube containing a small amount of mercury and an easily ionized starter gas. The microwave energy in the form of a high frequency and high intensity electric field excites the gas inside the bulb to extremely high energy levels, vaporizing the mercury, and causing the molecules in the resulting plasma to emit their characteristic wavelengths of light. The peak wavelength of the lamp used was 365 nanometers. Light from the lamp emits in all directions, with the portion impinging upon the reflector being redirected back towards the area of the conveyor belt within the photoinduction chamber. Samples are placed upon the conveyor belt which transports them through the photoinduction chamber. Curing speeds of the sample are a function of the light energy impinging upon the sample and the speed of the conveyor belt.

Figure 12:
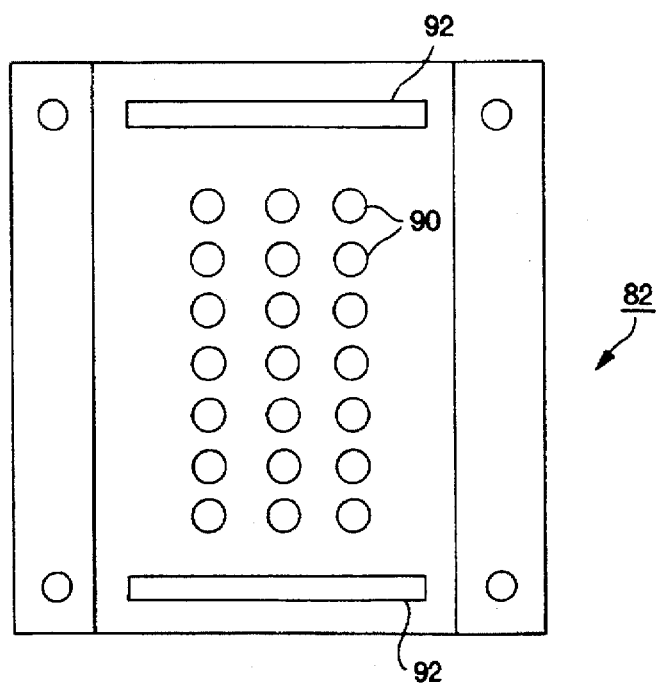
FIG. 12 is a top plan view of a conventional polished aluminum reflector used in a UV curing lamp system.

The waveguide/reflector 82 is further detailed in FIG. 12. The polished aluminum waveguide/reflector 82 incorporates a series of openings in the form of holes 90 and slots 92. The main purpose for these openings is to transmit and guide the microwave energy from the magnetron to the lamp. These openings can also be utilized to provide additional air circulation for cooling of the lamp.

Although it is necessary to provide these openings for the above reasons, it is desirable to limit these openings in order to maximize the surface area of the reflector available for the intended purpose of reflecting the UV light generated from the UV lamp. Without the openings, microwave energy would not transmit through the aluminum reflector to the bulb since it is well known that aluminum is not transmissive to microwave energy. It is also well known that expanded PTFE is extremely transmissive to microwave energy. In fact expanded PTFE has been calculated to have a microwave energy transmission rate of higher than 99.99%. Therefore, when expanded PTFE is combined with metal as a reflector for a microwave energy induced UV curing system, it is not necessary to provide openings in the expanded PTFE to enable transmission of the microwave energy. With fewer openings in the expanded PTFE reflective surface, there is more surface area available for UV reflection enabling an even further increase of reflectance efficiency.

A test was conducted by first establishing the light output of the system. This was accomplished by utilizing a light sensor 94, such as an IL 390B LIGHT BUG available from International Light, Inc., Newbury Port, Mass. The light sensor 94 records the total cumulative light energy exposure in milijoules/cm². The light sensor 94 was placed on the conveyor belt at a constant speed and run through the photoinduction chamber five times to establish a base line of the system. Then inventive material 88, such as described in sample 4 of Example 4, was attached to the surface of the polished aluminum waveguide/reflector 82, effectively replacing the reflector surface. This inventive material 88 had only a fraction of the openings as compared to the aluminum waveguide/reflector 82 such that a portion of the openings in the aluminum reflector were covered by the inventive reflective material. The relatively small fraction of openings in the expanded PTFE reflector were solely for the purpose of cooling air circulation. The light sensor 94 was again run through the system another five times at the same conditions as described above. The inventive material 88 was then removed and the light sensor 94 was again run through the system another five times at the same conditions. All of the data from the above test is reported in the table below:

|  | Polished Aluminum (mj/cm²) | Inventive Material (mj/cm²) | Polished Aluminum (mj/cm²) |
| --- | --- | --- | --- |
| Test 1 | 3391.2 | 3892.1 | 3436.4 |
| Test 2 | 3443.9 | 3922.9 | 3447.5 |
| Test 3 | 3429.2 | 3884.7 | 3405.7 |
| Test 4 | 3394.5 | 3881.7 | 3383.1 |
| Test 5 | 3361.4 | 3894.7 | 3382.8 |
| Average | 3404.0 | 3895.2 | 3411.1 |
| Std. Dev. | 32.8 | 16.4 | 29.9 |

Using the average values from the three runs, the calculated percent increase of total cumulative energy measured using the inventive material as a reflector was 14.3% higher than that of the standard polished aluminum reflector.

There are a variety of methods for combining a microwave guiding material such as metal with an expanded PTFE reflector. Certain methods include the thin coating of a metal material on an expanded PTFE substrate, i.e., vacuum deposition, sputter coating, lamination, etc., which can provide a flexible composite. Other embodiments could combine a rigid metal waveguide with the expanded PTFE reflector through adhesives or mechanical fasteners to create a relatively rigid composite reflector.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A method of providing improved reflectivity of light in a photoinduction chamber incorporating a UV lamp, which comprises:

providing a reflectant material comprising an expanded polytetrafluoroethylene having polymeric nodes interconnected by fibrils defining microporous voids therein; and mounting the (reflectant material such that light from the UV lamp can strike and reflect from the reflectant material.

2. The method of claim 1 that further comprises that the reflective material provides reflectivity.

3. The method of claim 1 that further comprises providing light in the photoinduction chamber including wavelengths in the visible light spectrum.

4. The method of claim 1 that further comprises the reflectant material reflecting greater than 90% of the UV light striking its surface.

5. The method of claim 1 that further comprises the reflectant material reflecting greater than 95% of the UV light striking its surface.

6. The method of claim 1 that further comprises the reflectant material reflecting greater than 99% of the UV light striking its surface.

7. A method of providing improved reflectivity of light in a photoinduction chamber which incorporates a microwave activated lamp, which comprises:

providing a reflectant material comprising an expanded polytetrafluoroethylene having polymeric nodes interconnected by fibrils defining microporous voids therein; and mounting the reflectant material such that microwave energy transmits through the reflective material, energizes the lamp, and that light from the lamp can strike and reflect from the reflectant material.

8. The method of claim 7 that further comprises the reflectant material reflecting greater than 99% of UV light striking its surface.

9. A photoinduction chamber that comprises:

a light source;

a reflective surface oriented to direct light from the light source;

a layer of reflectant material mounted on at least a portion of the reflective surface, the reflectant material comprising an expanded polytetrafluoroethylene having polymeric nodes interconnected by fibrils;

wherein the light source emits ultraviolet light, and greater than 95% of the ultraviolet light striking the reflectant material is reflected therefrom.

10. A photoinduction chamber that comprises:

a light source;

a reflective surface oriented to direct light from the light source;

a layer of reflectant material mounted on at least a portion of the reflective surface, the reflectant material comprising an expanded polytetrafluoroethylene having polymeric nodes interconnected by fibrils;

wherein the reflectant material reflects greater than 99% of the light striking its surface.

* * * * *